US006996085B2

(12) United States Patent
Travostino et al.

(10) Patent No.: US 6,996,085 B2
(45) Date of Patent: Feb. 7, 2006

(54) SYSTEM, DEVICE, AND METHOD FOR PROVIDING NETWORK ACCESS IN A COMMUNICATION SYSTEM

(75) Inventors: Franco Travostino, Arlington, MA (US); Robert L. Myers, Mississauga (CA)

(73) Assignee: Nortel Networks Limited, (CA)

( * ) Notice: Subject to any disclaimer, the term of this patent is extended or adjusted under 35 U.S.C. 154(b) by 945 days.

(21) Appl. No.: 09/747,436

(22) Filed: Dec. 22, 2000

(65) Prior Publication Data

US 2002/0080754 A1    Jun. 27, 2002

(51) Int. Cl.
*H04Q 7/24*    (2006.01)
(52) U.S. Cl. .................. 370/338; 370/467; 370/469; 709/230
(58) Field of Classification Search ................ 370/328, 370/338, 401, 400, 352–356, 466, 467, 392, 370/278, 329, 386, 469; 709/250, 204, 239, 709/224, 230; 455/432.1, 560, 422; 702/61
See application file for complete search history.

(56) References Cited

U.S. PATENT DOCUMENTS

| | | | |
|---|---|---|---|
| 5,802,258 A | | 9/1998 | Chen .................... 395/182.08 |
| 6,542,740 B1 * | | 4/2003 | Olgaard et al. ......... 455/432.1 |
| 6,651,105 B1 * | | 11/2003 | Bhagwat et al. ............ 709/239 |
| 6,675,208 B1 * | | 1/2004 | Rai et al. .................... 709/224 |
| 6,721,805 B1 * | | 4/2004 | Bhagwat et al. ............ 709/250 |
| 6,763,012 B1 * | | 7/2004 | Lord et al. .................. 370/338 |
| 2002/0068558 A1 * | | 6/2002 | Janik .......................... 455/422 |

OTHER PUBLICATIONS

Mattison, S. et al., "Specification of the Bluetooth System—Core", Specification vol. 1, Dec. 1, 1999.
Lind, P. et al., "Specification of the Bluetooth System—Profiles", Specification vol. 2, Dec. 1, 1999.

* cited by examiner

*Primary Examiner*—John Pezzlo

(74) *Attorney, Agent, or Firm*—Steubing McGuinness & Manaras LLP

(57) ABSTRACT

The protocol layers of a wireless communication protocol (such as Bluetooth) are divided between an access point device and a back end device such that the access point device implements a lower protocol layer of the wireless communication protocol and the back end device implements upper protocol layers of the wireless communication protocol. This allows the access point device to be small, simple, and inexpensive. The back end device implements various state-based functions that are processor and memory intensive.

46 Claims, 9 Drawing Sheets

SYSTEM, DEVICE, AND METHOD FOR PROVIDING NETWORK ACCESS IN A COMMUNICATION SYSTEM

CROSS-REFERENCE TO RELATED APPLICATION(S)

The present application may be related to the following commonly owned United States patent application, which is hereby incorporated herein by reference in its entirety:

U.S. patent application Ser. No. 09/748,698 entitled SYSTEM, DEVICE, AND METHOD FOR MAINTAINING COMMUNICATION SESSIONS IN A COMMUNICATION SYSTEM, filed on even date herewith in the name of Franco Travostino.

FIELD OF THE INVENTION

The present invention relates generally to communication systems, and more particularly to providing network access in a communication system.

BACKGROUND OF THE INVENTION

In a typical wireless communication system, wireless terminal equipment (TE) devices access a host computer through various access point (AP) devices. The AP devices communicate with the TE devices using a wireless communication protocol, and communicate with the host computer using some other protocol, such as a local area network (LAN) protocol. Each communication protocol is typically composed of various protocol layers in what is often referred to as a protocol stack. The protocol layers are typically implemented in software, and require certain processing resources as well as certain memory resources (e.g., for the storage of state information and data). The AP devices typically support and implement the full wireless communication protocol stack, and therefore the AP devices are typically complex devices that require substantial processing and memory resources.

One wireless communication protocol is commonly known as Bluetooth. Bluetooth defines a wireless (RF) protocol layer as well as various combinations of higher protocol layers (referred to in Bluetooth as profiles) for using Bluetooth in various applications. Bluetooth is described in a Bluetooth core specification entitled *Specification of the Bluetooth System Core*, Volume 1.0 B, dated Dec. 1, 1999, which is hereby incorporated herein by reference in its entirety. Bluetooth profiles are described in a Bluetooth profiles specification entitled *Specification of the Bluetooth System Profiles*, Volume 1.0 B, dated Dec. 1, 1999, which is hereby incorporated herein by reference in its entirety. For convenience, the Bluetooth core specification and the Bluetooth profiles specification are referred to hereinafter collectively as the Bluetooth specification.

FIG. 1 shows a representation of a conventional wireless communication system 100 in accordance with an implementation of Bluetooth. The TE device 102 accesses the host computer 108 via the AP device 106, using a wireless communication protocol to communicate with the AP device 106 over a wireless medium 104 (e.g., RF through air, infrared through air).

The AP device 106 typically implements the full wireless communication protocol stack. Therefore, the AP device 106 is typically a complex device having substantial processing and memory resources.

FIG. 2 illustrates the various protocol stacks that are supported and implemented by the TE device 102, the AP device 106, and the host computer 108 within the conventional wireless communication system 100 in accordance with a LAN Access Profile of the Bluetooth specification.

The TE device 102 includes, among other things, baseband transceiver logic 202 with associated host controller interface (HCI) firmware 204 for sending and receiving protocol messages over the wireless medium 104, HCI driver logic 206, logical link control and adaptation protocol (L2CAP) logic 208 for providing connection-oriented or connectionless layer 2 services, link manager protocol (LMP) logic 210, service discovery protocol (SDP) logic 212, RF communication logic 214 for emulating multiple RS-232 connections over L2CAP, Point-to-Point Protocol (PPP) logic 216, Internet Protocol (IP) logic 218, TCP/UDP logic 220, and a number of applications 222.

The AP device 106 includes, among other things, a first protocol stack for communicating with the TE device 102 and a second protocol stack for communicating with the host computer 108. The first protocol stack includes, among other things, baseband transceiver logic 224 with associated HCI firmware 226 for sending and receiving protocol messages over the wireless medium 104, HCI driver logic 228, L2CAP logic 230, LMP logic 232, SDP logic 234, RF logic 236, PPP logic 238, IP logic 240, and Dynamic Host Configuration Protocol (DHCP) logic 242. The second protocol stack includes, among other things, LAN logic 244, IP logic 240, Proxy ARP (Address Resolution Protocol) logic 246 for resolving addresses, and AAA (authentication, authorization, and accounting) logic 248.

The host computer 108 includes, among other things, LAN logic 250, IP logic 252, TCP/UDP logic 254, and a number of applications 256.

SUMMARY OF THE INVENTION

In an embodiment of the present invention, the AP devices work in combination with a back end (BE) device to provide wireless access for the TE devices. Specifically, the wireless communication protocol stack is divided between the AP devices and the BE device, with the AP devices supporting and implementing a first protocol layer of the wireless communication protocol stack (typically the lowest protocol layer of the wireless communication protocol stack), and the BE device supporting and implementing a second protocol layer of the wireless communication protocol stack (typically the upper layers of the wireless communication protocol stack). Each AP device is coupled to the BE device over a communication network, such as an Ethernet LAN, and establishes a communication connection to the BE device. Protocol messages received by the AP devices from the TE devices are forwarded by the AP devices to the BE device over the pre-established communication connections, and protocol messages received by the AP devices from the BE device over the pre-established communication connections are forwarded by the AP devices to the TE devices. The AP devices are therefore "thin" AP (TAP) devices that support lo and implement only a small subset of the wireless communication protocol stack and therefore require minimal processing and memory resources. This allows the TAP devices to be small, simple, inexpensive devices that can be placed unobtrusively and ubiquitously within a networking environment. The BE device includes sufficient processing and memory resources for supporting many TE devices accessing the network through multiple TAP devices, and communicates with the host computer on behalf of the TE devices. It should be noted that this division of the wireless communication protocol stack between the TAP devices and the BE device is transparent to the TE devices and to the host computer, which require no changes to operate in such a wireless communication system.

In one embodiment of the invention, the protocol layers of a wireless communication protocol are divided between an access point device and a back end device such that the access point device implements a lower protocol layer of the wireless communication protocol and the back end device implements upper protocol layers of the wireless communication protocol.

The access point device receives upper protocol layer information from a terminal equipment device via the lower protocol layer and forwards the upper protocol layer information to the back end device over a pre-established communication connection.

The back end device receives the upper protocol layer information from the access point device over the pre-established communication connection and processes the upper protocol layer information.

The back end device forwards upper protocol layer information to the access point device over the pre-established communication connection.

The access point device receives the upper protocol layer information from the back end device over the pre-established communication connection and forwards the upper protocol layer information to the terminal equipment device using the lower protocol layer.

DETAILED DESCRIPTION OF A PREFERRED EMBODIMENT

Figure 1:
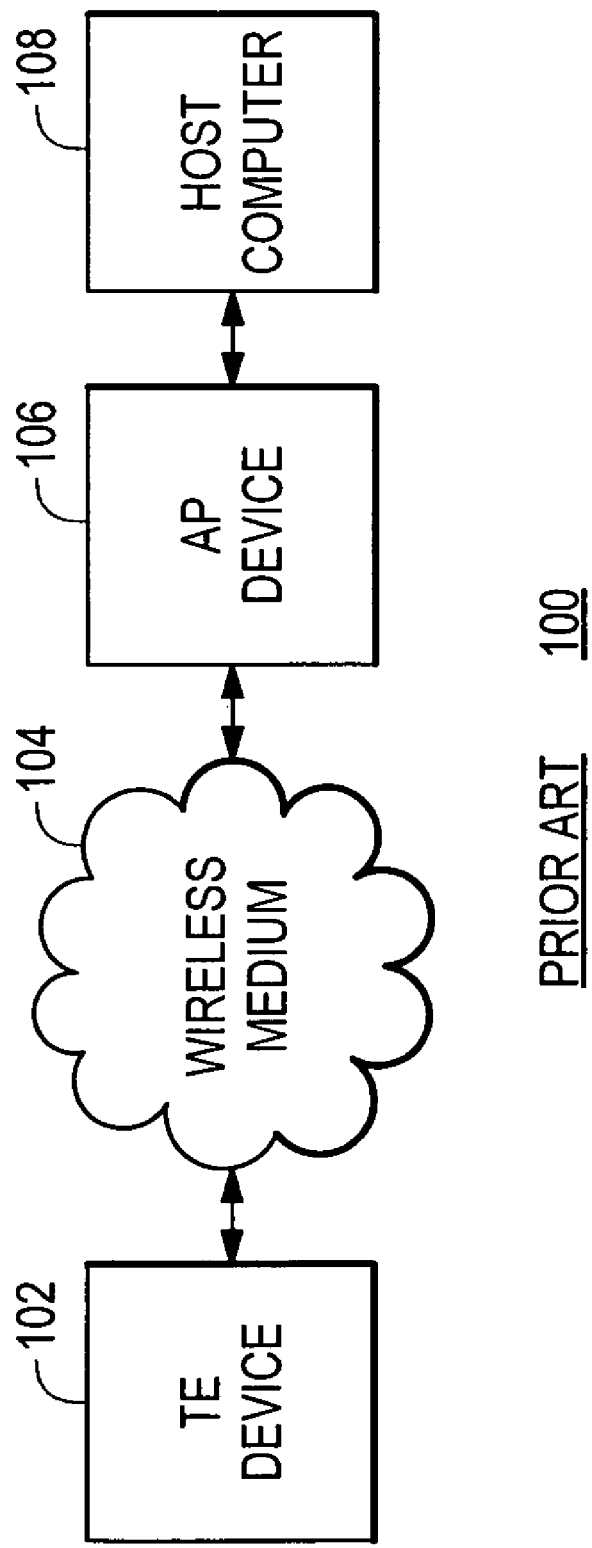
FIG. 1 is a system diagram showing an example of a conventional wireless communication system.

In an embodiment of the present invention, the AP devices work in combination with a back end (BE) device to provide wireless access for the TE devices. Specifically, the wireless communication protocol stack is divided between the AP devices and the BE device, with the AP devices supporting and implementing a first protocol layer of the wireless communication protocol stack (typically the lowest protocol layer of the wireless communication protocol stack), and the BE device supporting and implementing a second protocol layer of the wireless communication protocol stack (typically the upper layers of the wireless communication protocol stack). Each AP device is coupled to the BE device over a communication network, such as an Ethernet LAN, and establishes a communication connection to the BE device. Protocol messages received by the AP devices from the TE devices are forwarded by the AP devices to the BE device over the pre-established communication connections, and protocol messages received by the AP devices from the BE device over the pre-established communication connections are forwarded by the AP devices to the TE devices. The AP devices are therefore "thin" AP (TAP) devices that support and implement only a small subset of the wireless communication protocol stack and therefore require minimal processing and memory resources. This allows the TAP devices to be small, simple, inexpensive devices that can be placed unobtrusively and ubiquitously within a networking environment. The BE device includes sufficient processing and memory resources for supporting many TE devices accessing the network through multiple TAP devices, and communicates with the host computer on behalf of the TE devices. It should be noted that this division of the wireless communication protocol stack between the TAP devices and the BE device is transparent to the TE devices and to the host computer, which require no changes to operate in such a wireless communication system.

Bluetooth is one wireless communication system that can benefit from such division of the wireless communication protocol stack between the AP devices and the BE device. Bluetooth is a wireless access protocol that uses multiple AP devices spread throughout a networking environment to provide wireless access for portable TE devices. The effectiveness of the Bluetooth communication system is dependent to a large degree on the number and placement of the AP devices within the networking environment. Increased performance can be realized by increasing the number of AP devices. Because the AP devices are typically complex devices having substantial processing and memory resources, increasing the number of AP devices substantially increases the overall cost of the communication system. However, by using TAP devices that are small, simple, and inexpensive, it is possible to increase the number of AP devices without unduly increasing the overall cost of the communication system. For convenience, various embodiments of the invention are described herein in the context of a Bluetooth wireless communication system.

In an embodiment of the present invention, the wireless communication protocol stack (e.g., Bluetooth) is divided between TAP devices and a BE device. Each TAP device establishes a communication connection to the BE device. In a typical embodiment, the TAP devices communicate with the BE device over an Ethernet LAN, and the pre-established communication connections are Point-to-Point Protocol (PPP) connections that are established using a PPP-over-Ethernet (PPPOE) control protocol (referred to hereinafter as PPP/PPPoE communication connections). Protocol messages received by the TAP devices from the TE devices are forwarded by the TAP devices to the BE device over the pre-determined PPP/PPPoE communication connections, and protocol messages received by the TAP devices from the BE device over the pre-determined PPP/PPPoE communication connections are forwarded by the TAP devices to the TE devices.

Figure 3:
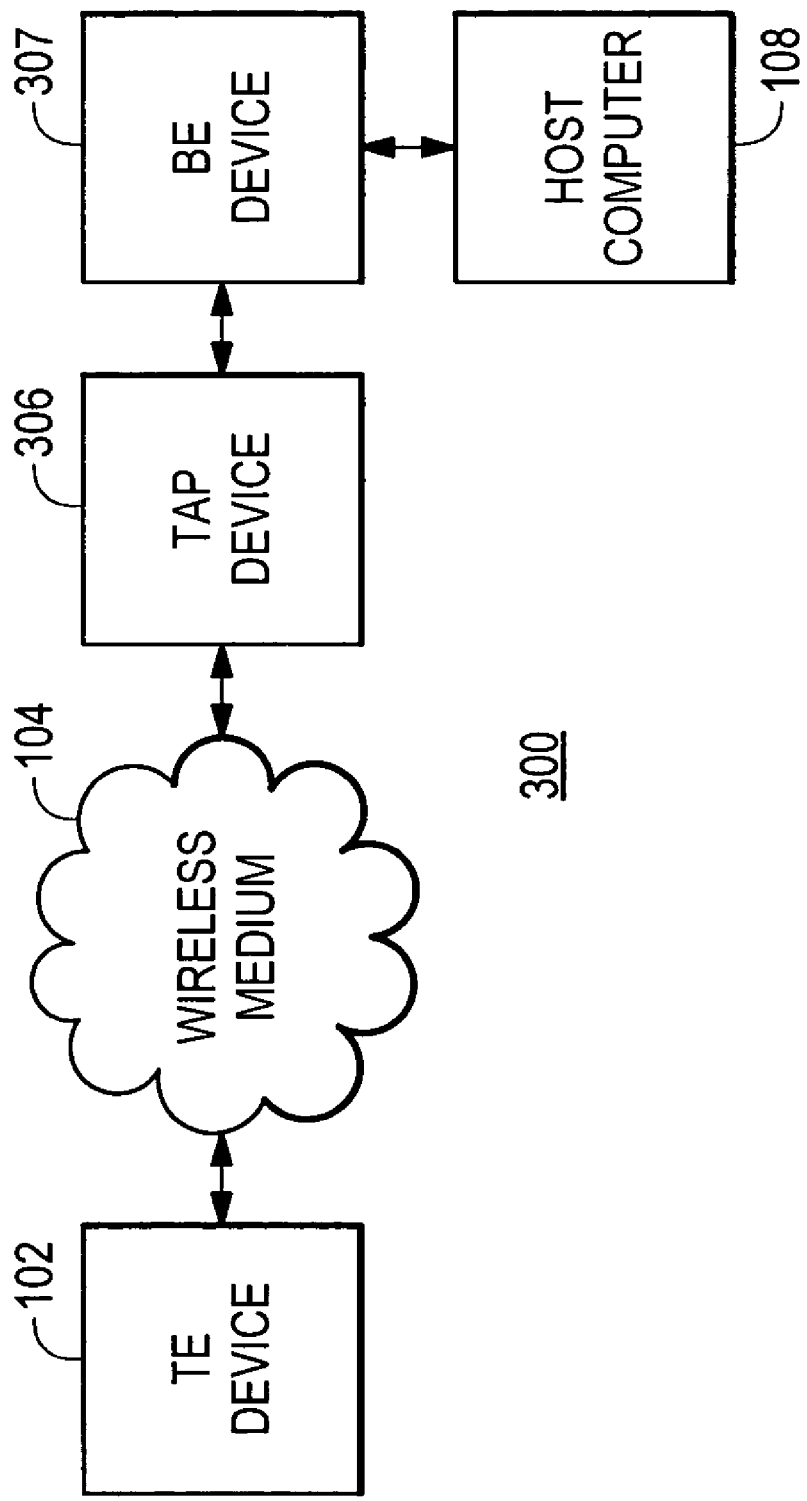
FIG. 3 is a system diagram showing an example of a wireless communication system in which an access point device implements a lower protocol layer of a wireless communication protocol and a back end device implements upper protocol layers of the wireless communication protocol in accordance with an embodiment of the present invention.

FIG. 3 shows a representation of a wireless communication system 300 in which the Bluetooth wireless communication protocol stack is divided between TAP devices and a BE device. The TE device 102 accesses the host computer 108 via the TAP device 306 using the Bluetooth wireless communication protocol. The TAP device 306 establishes a PPP/PPPoE communication connection to the BE device 307. Protocol messages received by the TAP device 306 from the TE device 102 are forwarded by the TAP device 306 to the BE device 307 over the pre-determined PPP/PPPoE communication connection, and protocol messages received by the TAP device 306 from the BE device 307 over the pre-determined PPP/PPPoE communication connection are forwarded by the TAP device 306 to the TE device 102. The BE device 307 includes sufficient processing and memory resources for supporting the TE device 102 and may other TE devices (not shown) accessing the network through the TAP device 306 and other TAP devices (not shown), and communicates with the host computer 108 on behalf of the TE device 102.

Figure 2:
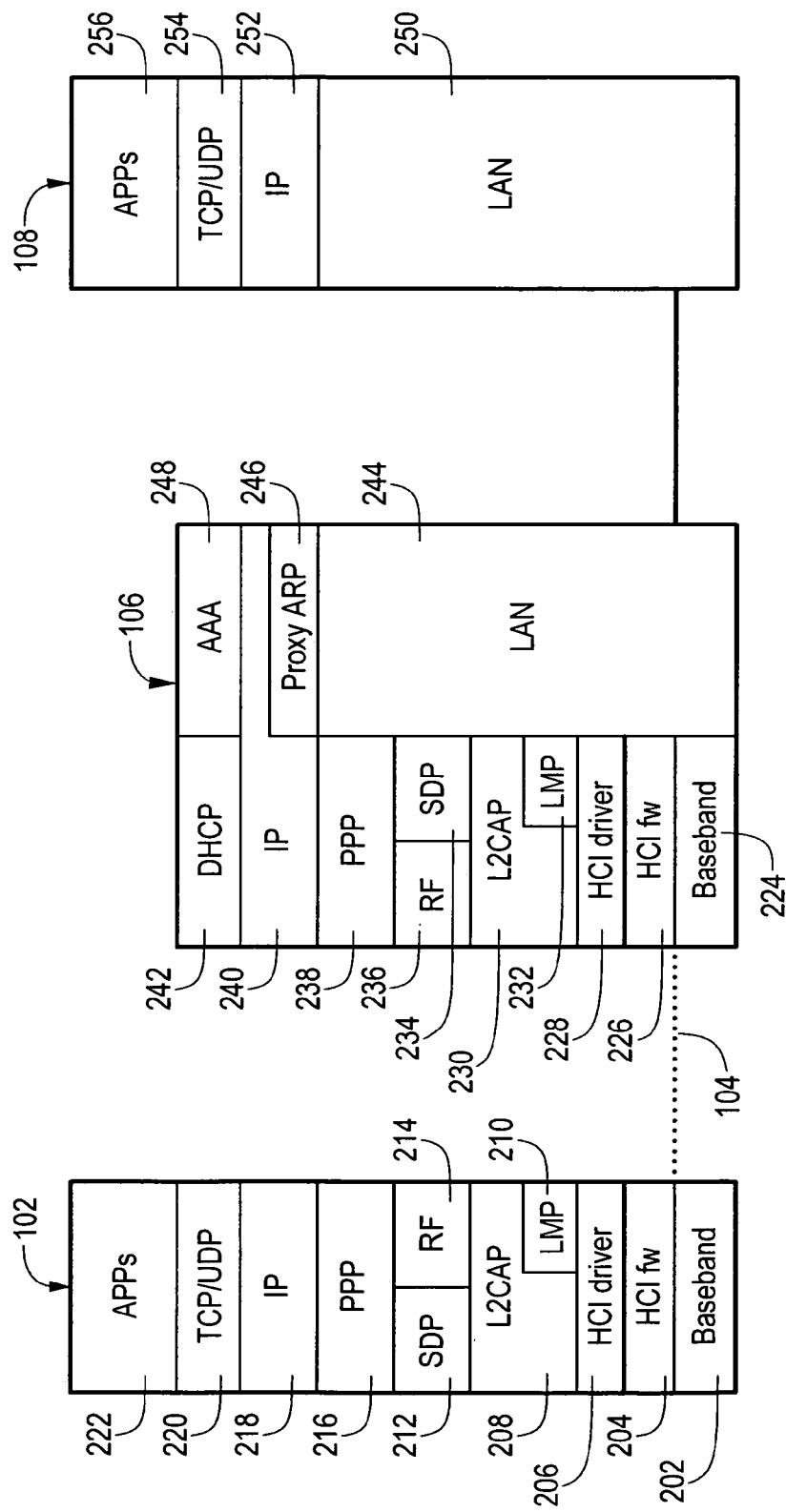
FIG. 2 is a block diagram showing sample protocols stacks of various devices in a conventional wireless communication system.
Figure 4:
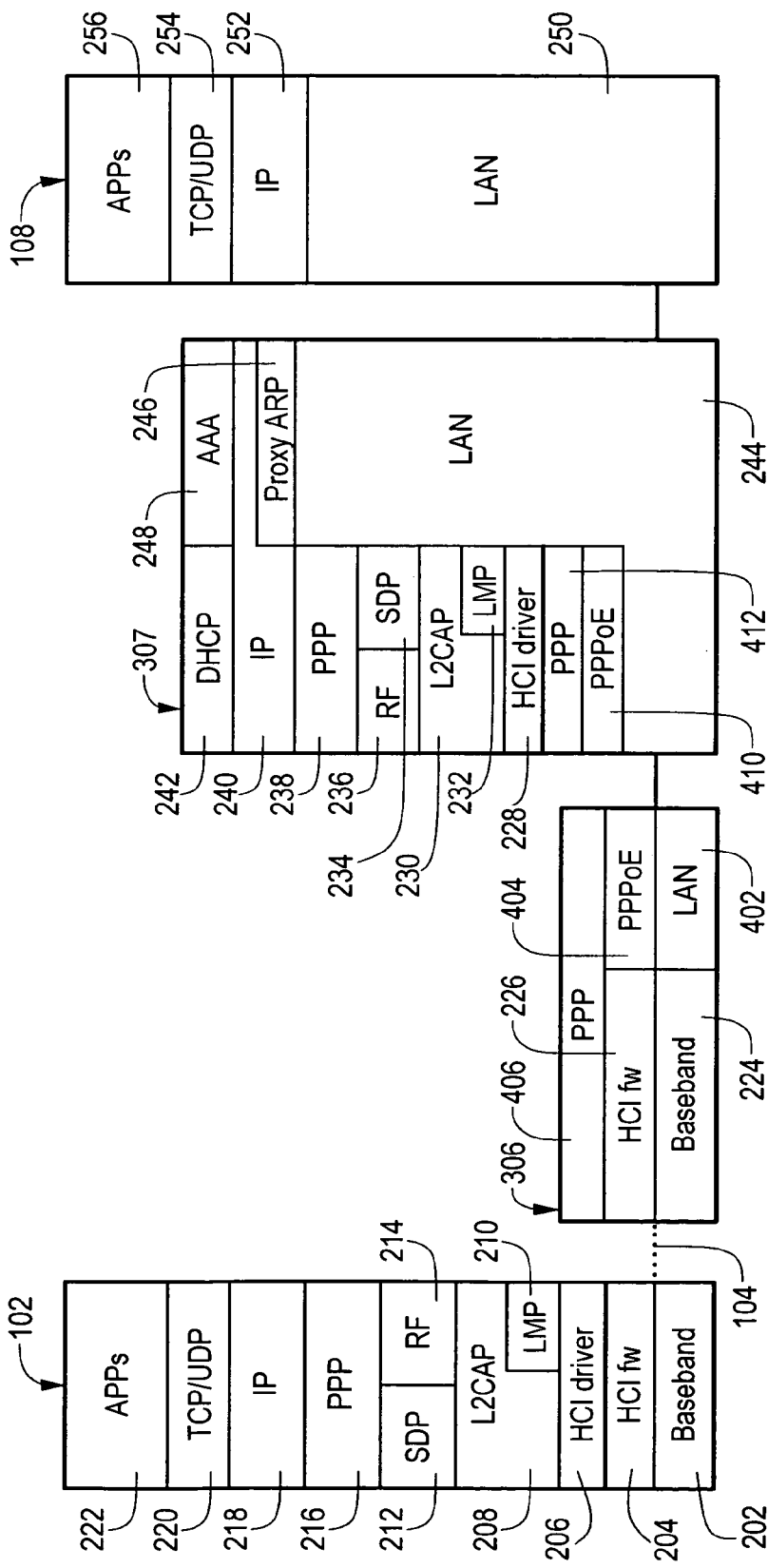
FIG. 4 is a block diagram showing sample protocol stacks of the access point device and the back end device in accordance with an embodiment of the present invention.

FIG. 4 illustrates the various protocol stacks that are supported and implemented by the TE device 102, the TAP device 306, the BE device 307, and the host computer 108 within the wireless communication system 300 in accordance with a LAN Access Profile of the Bluetooth specification. It should be noted that the protocol stacks in both the TE device 102 and the host computer 108 are the same in both the conventional communication system 100, as shown in FIG. 2, and the communication system 300, as shown in FIG. 4.

The TE device 102 includes, among other things, baseband transceiver logic 202 with associated HCI firmware 204 for sending and receiving protocol messages over the wireless medium 104, HCI driver logic 206, L2CAP logic 208, LMP logic 210, SDP logic 212, RF logic 214, PPP logic 216, IP logic 218, TCP/UDP logic 220, and a number of applications 222.

The TAP device 306 includes, among other things, a first protocol stack for communicating with the TE device 102 and a second protocol stack for communicating with the BE device 307. The first protocol stack implements the lower protocol layer of the wireless communication protocol, and includes, among other things, baseband transceiver logic 224 with associated HCI firmware 226 for sending and receiving protocol messages over the wireless medium 104. The second protocol stack includes, among other things, LAN logic 402, PPPoE control protocol logic 404 for establishing a PPP/PPPoE communication connection to the BE device 307 over the LAN, and PPP logic 406 for transferring protocol messages between the TE device 102 and the BE device 307.

The BE device 307 includes, among other things, a first protocol stack for communicating with the TAP device 306 and a second protocol stack for communicating with the host computer 108. The first protocol stack implements the PPP/PPPoE protocols for communicating with the TAP device 306 and also implements the upper protocol layers of the wireless communication protocol, and includes, among other things, LAN logic 244, PPPoE control protocol logic 410, PPP logic 412, HCI driver logic 228, L2CAP logic 230, LMP logic 232, SDP logic 234, RF logic 236, PPP logic 238, IP logic 240, and DHCP logic 242. The second protocol stack includes LAN logic 244, proxy ARP logic 246, and AAA logic 248.

The host computer 108 includes, among other things, LAN logic 250, IP logic 252, TCP/UDP logic 254, and a number of applications 256.

It should be noted that the TAP device 306 includes very little logic, and the logic that is included in the TAP device 306 is not required to maintain substantial state information. Essentially, the TAP device 306 is only responsible for managing radio frequencies, amplifying signal over noise, performing retransmissions, establishing and maintaining the PPP/PPPoE connection to the BE device, and transferring protocol messages between the TE devices and the BE device. State information required by the TAP device 306 includes such things as PPP/PPPoE session identifier and settings (e.g., MTU), baseband retransmission state, and ACL/SCO mappings and channel properties for the LMP. Certain state information, such as the PPP/PPPoE session identifier and settings and the ACL/SCO mappings and channel properties are maintained by the BE device 307, and can therefore be recovered by the TAP device 306 from the BE device 307 rather than maintained by the TAP device 306.

On the other hand, the BE device 307 includes substantial logic and maintains substantial state information. The BE device 307 provides or may provide various state-based services. DHCP services typically include such things as reserving/allocating IP addresses for the TE devices and optimizing for use/re-use of the IP address space. AAA services may include such things as implementing an AAA client, implementing a remote AAA server, or implementing whole server functionality (e.g., for sharing policy information with other BE devices via a distributed file system). Proxy ARP services typically include returning TE device MAC addresses in response to queries received from the host computer. SDP services typically include such things as maintaining a database of services (such as Bluetooth services) and processing queries to the database (e.g., keyed on the TAP device from which the query is received). RF services typically include tracking existing sessions over the RS-232 emulation. PPP services typically include maintaining session identifier and settings (e.g., MTU) for PPP connections between the TE devices and the BE device. LMP services typically include such things as a link key, encryption status, encryption key, encryption key size, QoS classes, and hold/sniff/park toggles. L2CAP services typically include such things as packet re-assembly, upper-protocol and lower-protocol state machines, connection information for connection-oriented channels, and MTU and QoS classes. PPP/PPPoE services typically include maintaining session identifier and settings for the PPP/PPPoE connections to the TAP devices. Additional services may include such things as network address translation (NAT), firewall functionality, configuration/management services (e.g., via SNMP), and BE device pooling (i.e., maintaining multiple BE devices for aggregation and load balancing).

In order for communications to occur between the TE device 102 and the host computer 108, wireless layer 1 protocol exchanges occur between the TE device 102 and the TAP device 306, while wireless layer 2 protocol exchanges occur between the TE device 102 and the BE device 307. Thus, the TE device 102 and the TAP device 306 are peer devices at the baseband layer, while the TE device 102 and the BE device 307 are peer devices at the higher wireless communication protocol layers, such as L2CAP, RF, SDP, and PPP layers.

In order to transfer protocol messages between the TE device 102 and the BE device 307, protocol layers within the TAP device 306 interoperate with peer protocol layers in the TE device 102 and the BE device 307. Specifically, the baseband logic and HCI firmware in the TAP device 306 interoperate with peer baseband logic and HCI firmware in the TE device 102. Also, the LAN logic, PPPoE control protocol logic, and PPP logic in the TAP device 306 interoperate with peer LAN logic, PPPoE control protocol logic, and PPP logic in the BE device 307.

Figure 5:
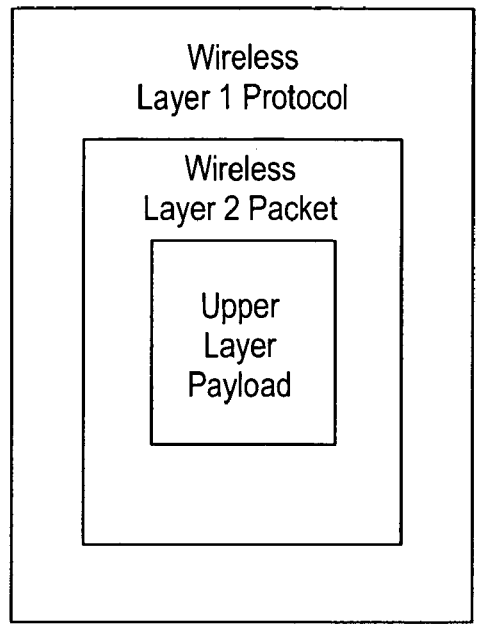
FIG. 5 shows a representation of a wireless protocol message for communication between a terminal equipment device and the access point device in accordance with an embodiment of the present invention.

More specifically, the TE device 102 communicates with the host computer 108 by forming a wireless protocol message and transmitting the wireless protocol message to the TAP device 306. FIG. 5 shows a representation of a wireless protocol message 500 sent by the TE device 102 to the TAP device 306. The wireless protocol message 500 includes an upper layer payload encapsulated in a wireless layer 2 packet. The TE device 102 transmits the wireless protocol message 500 to the TAP device 306 using the wireless layer 1 protocol.

Figure 6:
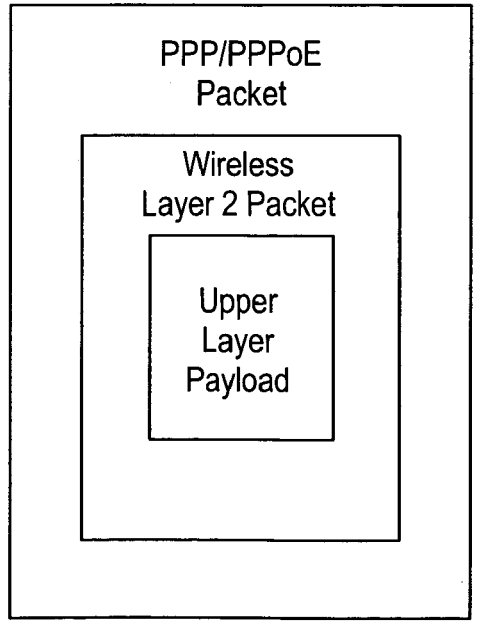
FIG. 6 shows a representation of a PPP/PPPoE protocol message for communication between the access point device and the back end device in accordance with an embodiment of the present invention.

When the TAP device 306 receives the wireless protocol message 500 from the TE device 102, the TAP device 306 forms a PPP/PPPoE protocol message and forwards the PPP/PPPoE protocol message over a pre-established PPP/PPPoE communication connection to the BE device 307. Specifically, the TAP device 306 extracts the wireless layer 2 packet (including the upper layer payload) from the wireless protocol message 500, and encapsulates the wireless layer 2 packet (including the upper layer payload) in a PPP/PPPoE packet. The TAP device 306 forwards the PPP/PPPoE packet to the BE device 307 over the pre-established PPP/PPPoE connection. FIG. 6 shows a representation of a PPP/PPPoE protocol message 600 sent by the TAP device 306 to the BE device 307. The PPP/PPPoE protocol message 600 includes the wireless layer 2 packet (including the upper layer payload) encapsulated in a PPP/PPPoE packet. The TAP device 306 transmits the PPP/PPPoE protocol message 600 to the BE device 307 over the pre-established PPP/PPPoE connection.

Figure 7:
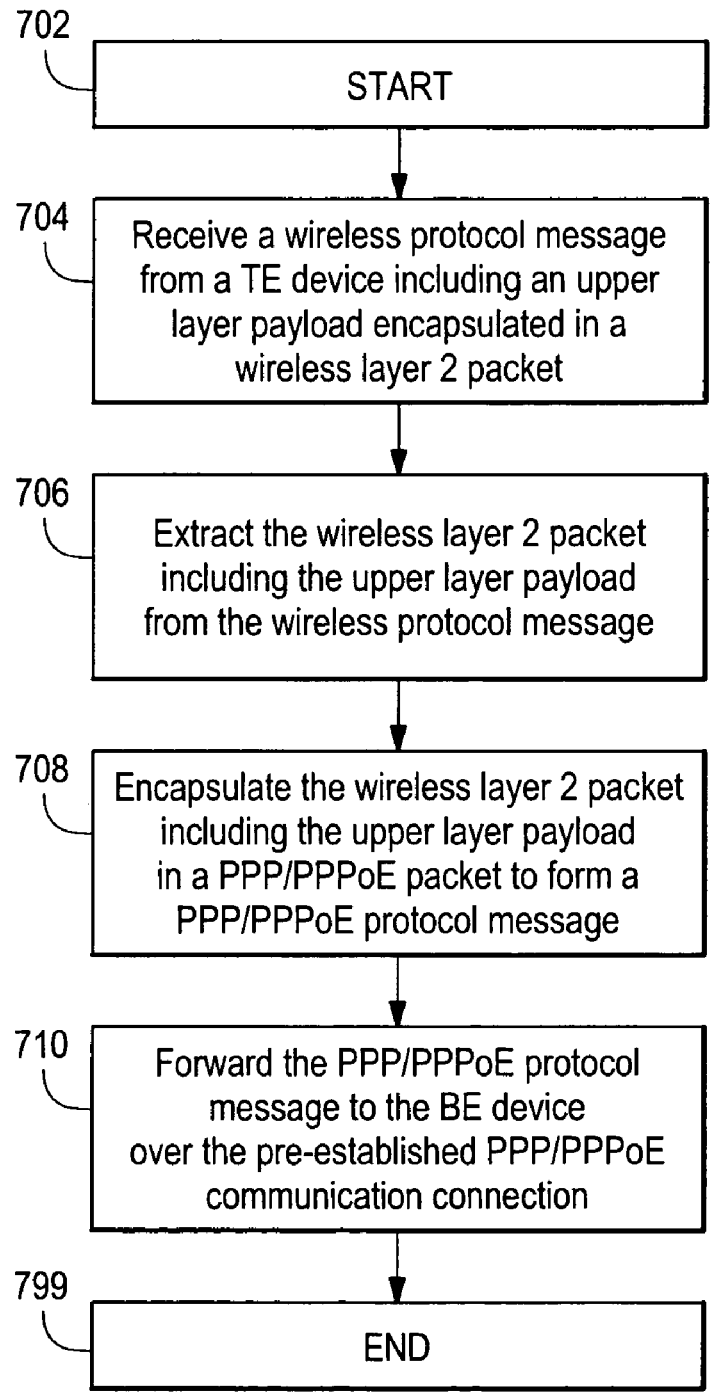
FIG. 7 is a logic flow diagram showing sample access point device logic for processing a wireless protocol message received from the terminal equipment device in accordance with an embodiment of the present invention.

FIG. 7 shows sample TAP device logic 700 for processing a wireless protocol message received from the TE device 102. Beginning at block 702, the logic receives a wireless protocol message from the TE device 102 including an upper layer payload encapsulated in a wireless layer 2 packet, in block 704. The logic extracts the wireless layer 2 packet including the upper layer payload from the wireless protocol message, in block 706. The logic encapsulates the wireless layer 2 packet including the upper layer payload in a PPP/PPPoE packet to form a PPP/PPPoE protocol message, in block 708, and forwards the PPP/PPPoE protocol message to the BE device 307 over the pre-established PPP/PPPoE communication connection, in block 710. The logic 700 terminates in block 799.

When the BE device 307 receives the PPP/PPPoE protocol message 600 from the TAP device 306, the BE device 307 decapsulates the wireless layer 2 packet (including the upper layer payload) from the PPP/PPPoE packet, and processes the wireless layer 2 packet and the upper layer payload. This processing typically involves, among other things, processing the wireless communication protocol layers of the wireless layer 2 packet and the upper layer payload as a termination point of the wireless communication protocol, and forwarding transport and application layer information from the upper layer payload to the host computer 108.

Figure 8:
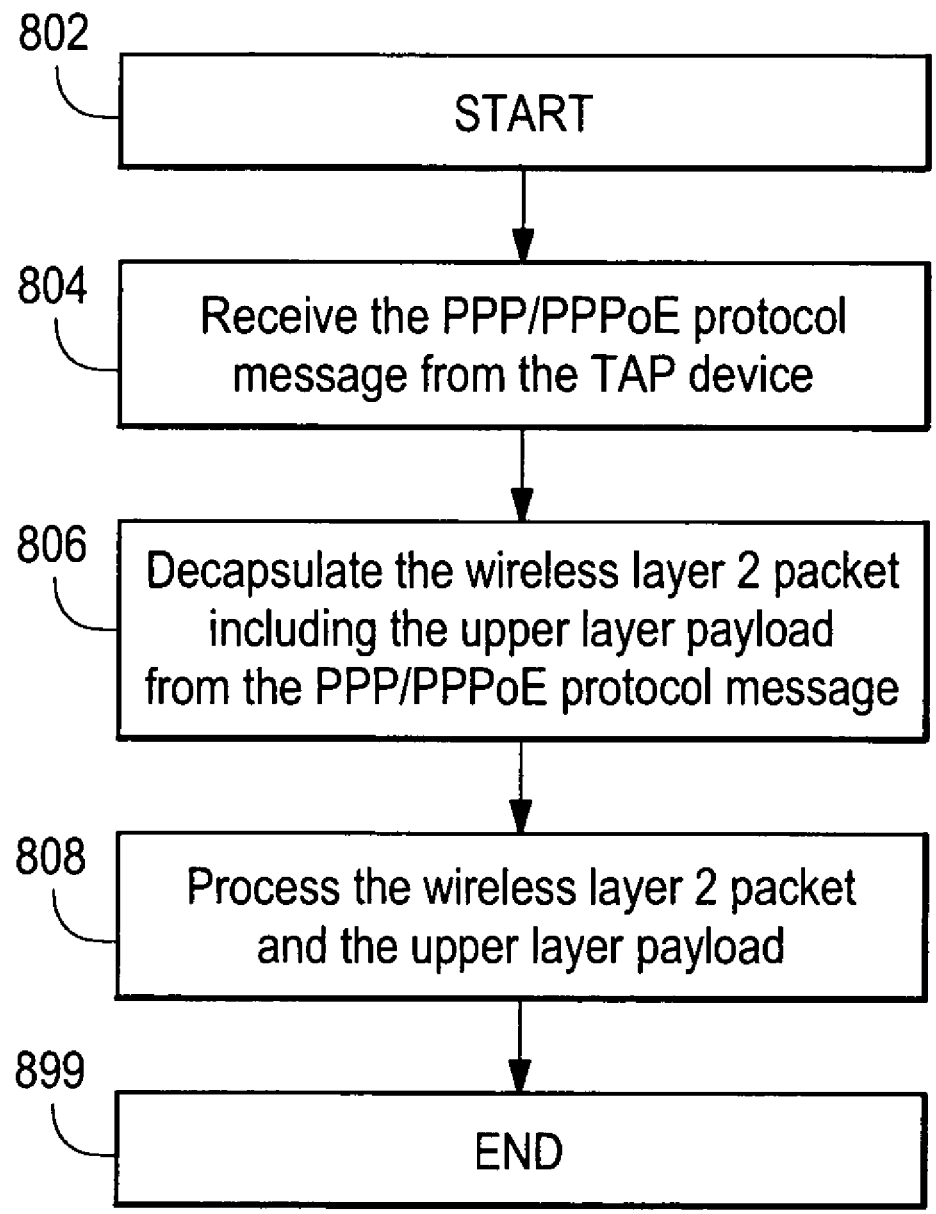
FIG. 8 is a logic flow diagram showing sample back end device logic for processing a PPP/PPPoE protocol message received from the access point device in accordance with an embodiment of the present invention.

FIG. 8 shows sample BE device logic 800 for processing a PPP/PPPoE protocol message received from the TAP device 306. Beginning at block 802, the logic receives the PPP/PPPoE protocol message from the TAP device 306, in block 804. The logic decapsulates the wireless layer 2 packet including the upper layer payload from the PPP/PPPoE protocol message, in block 806. The logic processes the wireless layer 2 packet and the upper layer payload, in block 808. The logic 800 terminates in block 899.

Conversely, the host computer 108 communicates with the TE device 102 by sending transport and application layer information to the BE device 307. The BE device 307 forms a wireless layer 2 packet including an upper layer payload for sending the transport and application layer information to the TE device 102. The BE device 307 forms a PPP/PPPoE protocol message by encapsulating the wireless layer 2 packet (including the upper layer payload) in a PPP/PPPoE packet, as shown in FIG. 6, and sends the PPP/PPPoE protocol message to the TAP device 306 over the pre-established PPP/PPPoE connection. It should be noted that the BE device 307 is typically coupled to multiple TAP devices, and therefore the BE device 307 sends the PPP/PPPoE protocol message to the appropriate TAP device based upon addressing information provided by the host computer 108.

Figure 9:
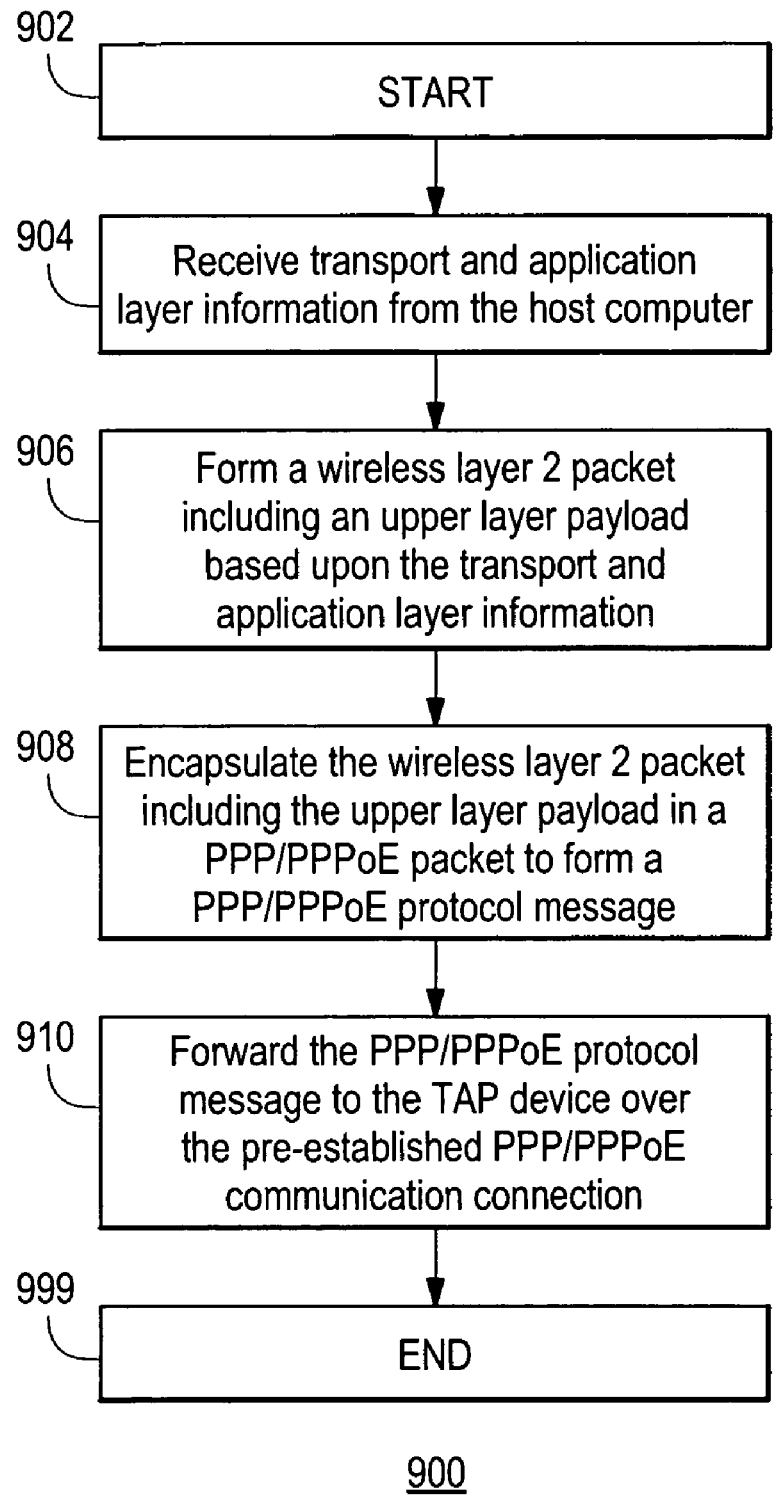
FIG. 9 is a logic flow diagram showing sample back end device logic for sending upper protocol layer information to the access point device in accordance with an embodiment of the present invention.

FIG. 9 shows sample BE device logic 900 for processing transport and application layer information received from the host computer 108. Beginning at block 902, the logic receives transport and application layer information from the host computer 108, in block 904. The logic forms a wireless layer 2 packet including an upper layer payload based upon the transport and application layer information, in block 906. The logic then encapsulates the wireless layer 2 packet including the upper layer payload in a PPP/PPPoE packet to form a PPP/PPPoE protocol message, in block 908. The logic forwards the PPP/PPPoE protocol message to the TAP device 306 over the pre-established PPP/PPPoE communication connection, in block 910. The logic 900 terminates in block 999.

When the TAP device 306 receives the PPP/PPPoE protocol message 600 from the BE device 307, the TAP device decapsulates the wireless layer 2 packet (including the upper layer payload) from the PPP/PPPoE packet, and sends a wireless protocol message to the TE device 102 using the wireless layer 1 protocol. As shown in FIG. 5, the wireless protocol message 500 includes the wireless layer 2 packet (including the upper layer payload) from the PPP/PPPoE packet. It should be noted that the TAP device 306 may be in communication with multiple TE devices, and therefore the TAP device 306 sends the wireless protocol message 500 to the appropriate TE device 102 based upon addressing information provided by the BE device 307 (e.g., in the wireless layer 2 packet).

Figure 10:
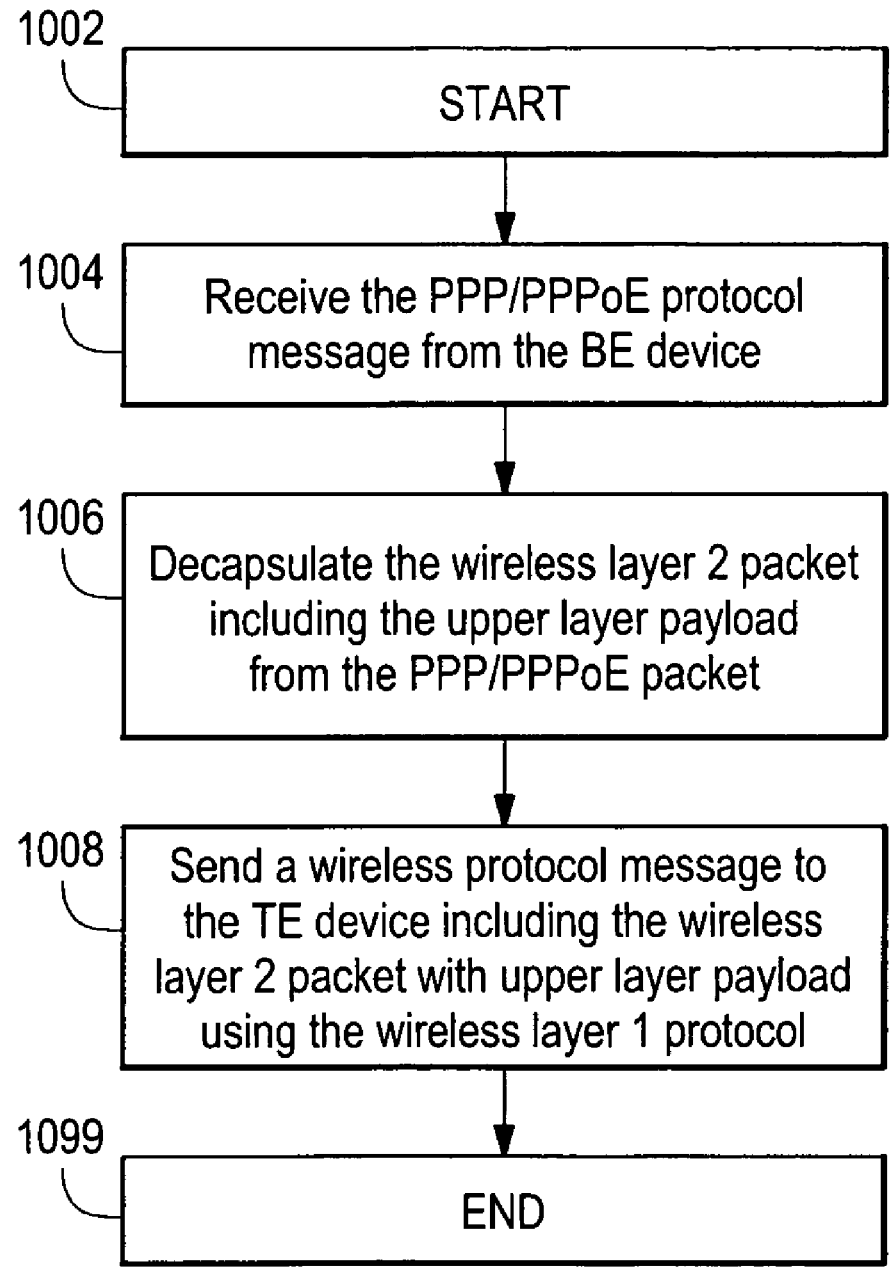
FIG. 10 is a logic flow diagram showing sample access point device logic for processing a PPP/PPPoE protocol message received from the back end device in accordance with an embodiment of the present invention.

FIG. 10 shows sample TAP device logic 1000 for processing the PPP/PPPoE protocol message received from the BE device 307. Beginning at block 1002, the logic receives the PPP/PPPoE protocol message from the BE device 307, in block 1004. The logic decapsulates the wireless layer 2 packet including the upper layer payload from the PPP/PPPoE packet, in block 1006. The logic sends a wireless protocol message to the TE device 102 including the wireless layer 2 packet with upper layer payload using the wireless layer 1 protocol, in block 1008. The logic 1000 terminates in block 1099.

It should be noted that, in the embodiments described above, there is typically a peer PPP connection between the TE device 102 and the BE device 307 as specified by the Bluetooth wireless communication protocol, and there is typically also a peer PPP/PPPoE connection between the TAP device 306 and the BE device 307. These PPP-based connections are distinct. PPP-based protocol messages exchanged between the TE device 102 and the BE device 307 pursuant to the Bluetooth wireless communication protocol are carried within PPP/PPPoE protocol messages exchanged between the TAP device 306 and the BE device 307.

It should be noted that, in the event of a TAP device failure, particularly during communications between a TE device and the host computer, communications can be switched over to another TAP device. This would involve such things as identifying a new TAP device for the TE device (e.g., the next-closest TAP device to the TE device) and remapping communications from the failed (old) TAP device to the new TAP device by the BE device. Such a "hand-off" from the old TAP device to the new TAP device is described in the related application incorporated by reference above.

Likewise, communications can be switched over from one TAP device to another TAP device as the TE device moves away from the one TAP device and closer to the other TAP device, as described in the related application incorporated by reference above.

It should be noted that the protocol stacks shown and described with reference to FIG. 2 and FIG. 4 are exemplary of the LAN Access Profile of the Bluetooth specification. However, the present invention can be applied to other Bluetooth profiles as well as to other communication protocols and profiles. Typically, embodiments implementing other Bluetooth profiles require appropriate changes to at least the upper protocol layers of the TE device 102 and the BE device 307.

In the described embodiments, the TAP devices are coupled to the BE device over an Ethernet LAN and communicate with the BE device using PPP/PPPoE communication connections. However, the present invention is in no way limited by the way in which the TAP devices communicate with the BE device. The TAP devices can communicate with the BE device using any of a variety of communication technologies and protocols.

In the described embodiments, the wireless communication protocol is the Bluetooth wireless communication protocol. However, the present invention is in no way limited to the Bluetooth wireless communication protocol or to any particular wireless communication protocol. Various aspects of the present invention can be applied to other wireless communication protocols, including modifications and derivations of the Bluetooth wireless communication protocol.

It should be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the TAP device logic and BE device logic is implemented as a set of computer program instructions that is converted into a computer executable form, stored as such in a computer readable medium, and executed by a microprocessor within the TAP device 306 and BE device 307, respectively, under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A wireless communication system comprising an access point device in communication with a back end device, the access point for wirelessly communicating with a terminal equipment device and the back end device for communicating with a host device, wherein the access point device and the back end device work in conjunction to implement a plurality of protocol layers of a wireless communication protocol for enabling communication between the terminal equipment device and a host device, and
   wherein the access point device is operably coupled to forward upper protocol layer information from the wireless protocol message to the back end device over a pre-established PPP-over-Ethernet connection communication connection established only between the access point and the back end device.

2. The wireless communication system of claim 1, wherein:
   the plurality of protocol layers of the wireless communication protocol comprise a lower protocol layer for sending and receiving protocol messages over a wireless medium and upper protocol layers for generating and processing the protocol messages;
   the access point device implements the lower protocol layer, and the back end device implements the upper protocol layers.

3. The wireless communication system of claim 1, wherein the access point device is operably coupled to receive a wireless protocol message from a terminal equipment using the lower protocol layer.

4. The wireless communication system of claim 2, wherein the back end device is operably coupled to receive the upper protocol layer information from the access point device over the pre-established communication connection and process the upper protocol layer information.

5. The wireless communication system of claim 2, wherein the back end device is operably coupled to send upper protocol layer information to the access point device over a pre-established communication connection.

6. The wireless communication system of claim 5, wherein the access point device is operably coupled to receive the upper protocol layer information from the back end device over the pre-established communication connection and transmit a wireless protocol message to a terminal equipment using the lower protocol layer, the wireless protocol message including the upper protocol layer information.

7. The wireless communication system of claim 2, wherein the wireless communication protocol comprises a Bluetooth wireless communication protocol, and wherein the access point device comprises baseband transceiver logic and associated HCI firmware for implementing the lower protocol layer of the Bluetooth wireless communication protocol.

8. The wireless communication system of claim 7, wherein the back end device comprises logic for implementing the upper protocol layers of the Bluetooth wireless communication protocol.

9. The wireless communication system of claim 8, wherein the back end device further comprises logic for implementing additional state-based services.

10. The wireless communication system of claim 1, wherein the access point device and the back end device are operably coupled to exchange upper protocol layer information over a pre-established communication connection.

11. The wireless communication system of claim 10, wherein the access point device comprises logic for establishing the communication connection to the back end device.

12. The wireless communication system of claim 10, wherein the back end device comprises logic for establishing the communication connection to the access point device.

13. The wireless communication system of claim 10, wherein the access point device and the back end device communicate over a local area network, and wherein the pre-established communication connection is a logical connection over the local area network.

14. The wireless communication system of claim 13, wherein the local area network is an Ethernet local area network.

15. An access point device for use in a wireless communication system, the access point device comprising:
   a wireless interface implementing a lower protocol layer of a wireless communication protocol for exchanging wireless communication messages with a terminal equipment device;
   a back end interface for communicating with a back end device using a pre-established PPPoE connection established only between the access point and the back end device, wherein the back end interface implements upper protocol layers of the wireless communication protocol and
   forwarding logic operably coupled to receive upper protocol layer information over one of said wireless interface and said back end interface and forward the upper protocol layer information over the other of said wireless interface and said back end interface.

16. The access point device of claim 15, wherein the forwarding logic is operably coupled to receive over the wireless interface a wireless communication message including the upper protocol layer information and forward over the back end interface a communication message including the upper protocol layer information.

17. The access point device of claim 16, wherein the communication message forwarded over the back end interface comprises a PPP/PPPoE communication message including the upper protocol layer information.

18. The access point device of claim 15, wherein the forwarding logic is operably coupled to receive over the back end interface a communication message including the upper protocol layer information and forward over the wireless interface a wireless communication message including the upper protocol layer information.

19. The access point device of claim 18, wherein the communication message received over the back end interface comprises a PPP/PPPoE communication message including the upper protocol layer information.

20. The access point device of claim 15, wherein the wireless communication protocol comprises a Bluetooth wireless communication protocol.

21. The access point device of claim 20, wherein the lower protocol layer comprises a Bluetooth lower protocol layer.

22. The access point device of claim 20, wherein the upper protocol layers comprise a Bluetooth upper protocol layer.

23. A computer program stored on a computer readable medium for operating an access point device in a wireless communication system, the computer program comprising:
    wireless interface logic implementing a lower protocol layer of a wireless communication protocol for exchanging wireless communication messages with a terminal equipment device over a wireless interface;
    back end interface logic for communicating with a back end device that implements upper protocol layers of the wireless communication protocol using a pre-established PPPoE communication connection; and
    forwarding logic programmed to receive upper protocol layer information using one of said wireless interface logic and said back end interface logic and forward the upper protocol layer information using the other of said wireless interface logic and said back end interface logic.

24. The computer program of claim 23, wherein the forwarding logic is programmed to receive over the wireless interface using the wireless interface logic a wireless communication message including the upper protocol layer information and forward over the back end interface using the back end interface logic a communication message including the upper protocol layer information.

25. The computer program of claim 24, wherein the communication message forwarded over the back end interface comprises a PPP/PPPoE communication message including the upper protocol layer information.

26. The computer program of claim 23, wherein the forwarding logic is programmed to receive over the back end interface using the back end interface logic a communication message including the upper protocol layer information and forward over the wireless interface using the wireless interface logic a wireless communication message including the upper protocol layer information.

27. The computer program of claim 26, wherein the communication message received over the back end interface comprises a PPP/PPPoE communication message including the upper protocol layer information.

28. The computer program of claim 23, wherein the wireless communication protocol comprises a Bluetooth wireless communication protocol.

29. The computer program of claim 28, wherein the lower protocol layer comprises a Bluetooth lower protocol layer.

30. The computer program of claim 28, wherein the upper protocol layers comprise a Bluetooth upper protocol layer.

31. A back end device for use in a wireless communication system/the back end device comprising:
    upper protocol layer logic implementing upper protocol layers of a wireless communication protocol; and
    an access point interface for exchanging upper protocol layer information with an access point device on a pre-established PPPoE communication connection established only between the access point and back end device wherein the access point receives wireless communications from a terminal equipment device and implements a lower protocol layer of the wireless communication protocol.

32. The back end device of claim 31, wherein the upper protocol layer logic is operably coupled to receive over the access point interface a communication message including upper protocol layer information and process the upper protocol layer information.

33. The back end device of claim 32, wherein the communication message received over the access point interface comprises a PPP/PPPoE communication message including the upper protocol layer information.

34. The back end device of claim 31, wherein the upper protocol layer logic is operably coupled to send over the access point interface a communication message including upper protocol layer information.

35. The back end device of claim 34, wherein the communication message sent over the access point interface comprises a PPP/PPPoE communication message including the upper protocol layer information.

36. The back end device of claim 31, wherein the wireless communication protocol comprises a Bluetooth wireless communication protocol.

37. The back end device of claim 36, wherein the lower protocol layer comprises a Bluetooth lower protocol layer.

38. The back end device of claim 36, wherein the upper protocol layers comprise a Bluetooth upper protocol layer.

39. A computer program stored on a computer readable medium for operating a back end device in a wireless communication system, the computer program comprising:
    upper protocol layer logic implementing upper protocol layers of a wireless communication protocol; and
    access point interface logic for exchanging upper protocol layer information with an access point device on a pre-established PPPoE communication connection established only between the access point and the back end device, wherein the access point device receives wireless communications from a terminal equipment device and implements a lower protocol layer of the wireless communication protocol over an access point interface.

40. The computer program of claim 39, wherein the upper protocol layer logic is programmed to receive over the access point interface using the access point interface logic a communication message including upper protocol layer information and process the upper protocol layer information.

41. The computer program of claim 40, wherein the communication message received over the access point interface using the access point interface logic comprises a PPP/PPPoE communication message including the upper protocol layer information.

42. The computer program of claim 39, wherein the upper protocol layer logic is programmed to send over the access point interface using the access point interface logic a communication message including upper protocol layer information.

43. The computer program of claim 42, wherein the communication message sent over the access point interface using the access point interface logic comprises a PPP/PPPoE communication message including the upper protocol layer information.

44. The computer program of claim 39, wherein the wireless communication protocol comprises a Bluetooth wireless communication protocol.

45. The computer program of claim 44, wherein the lower protocol layer comprises a Bluetooth lower protocol layer.

46. The computer program of claim 44, wherein the upper protocol layers comprise a Bluetooth upper protocol layer.

* * * * *

UNITED STATES PATENT AND TRADEMARK OFFICE
CERTIFICATE OF CORRECTION

| | | |
|---|---|---|
| PATENT NO. | : 6,996,085 B2 | |
| APPLICATION NO. | : 09/747436 | |
| DATED | : February 7, 2006 | |
| INVENTOR(S) | : Travostino et al. | |

It is certified that error appears in the above-identified patent and that said Letters Patent is hereby corrected as shown below:

At column 13, line 43: PPP of communication <u>established only between the access point and the back end device</u>; and At column 14, line 20, device<u>,</u> wherein the access point Signed and Sealed this Fifth Day of September, 2006

JON W. DUDAS
*Director of the United States Patent and Trademark Office*